US009659252B2

(12) United States Patent
Jocker et al.

(10) Patent No.: US 9,659,252 B2
(45) Date of Patent: May 23, 2017

(54) METHOD TO CHARACTERIZE HETEROGENEOUS ANISOTROPIC MEDIA

(71) Applicant: Schlumberger Technology Corporation, Sugar Land, TX (US)

(72) Inventors: Jeroen Jocker, Vlaardingen (NL); Erik Wielemaker, Haag (NL); Romain Charles Andre Prioul, Somerville, MA (US); Henri-Pierre Valero, Yokohama (JP); Maurizio Ferla, Cremona (IT); Ferdinanda Pampuri, Milan (IT)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 369 days.

(21) Appl. No.: 14/373,034

(22) PCT Filed: Jan. 22, 2013

(86) PCT No.: PCT/US2013/022535
§ 371 (c)(1),
(2) Date: Jul. 18, 2014

(87) PCT Pub. No.: WO2013/112466
PCT Pub. Date: Aug. 1, 2013

(65) Prior Publication Data
US 2014/0365420 A1  Dec. 11, 2014

Related U.S. Application Data

(60) Provisional application No. 61/589,710, filed on Jan. 23, 2012.

(51) Int. Cl.
*G01V 11/00* (2006.01)
*G06N 5/04* (2006.01)
(Continued)

(52) U.S. Cl.
CPC .................. *G06N 5/04* (2013.01); *G01V 1/48* (2013.01); *G01V 11/00* (2013.01); *G01V 99/00* (2013.01); *G06N 7/005* (2013.01)

(58) Field of Classification Search
CPC .......... G06N 5/04; G06N 7/005; G01V 99/00; G01V 11/00; G01V 1/48
See application file for complete search history.

(56) References Cited

U.S. PATENT DOCUMENTS 4,594,691 A  6/1986  Kimball et al.
5,109,697 A  5/1992  Millheim et al.
(Continued)

FOREIGN PATENT DOCUMENTS

WO  2013/016470 A2  1/2013

OTHER PUBLICATIONS

Wikipedia, Posterior Probability page, published Jan. 21, 2012.*
(Continued)

*Primary Examiner* — Stanley K Hill
*Assistant Examiner* — Thomas Fink
(74) *Attorney, Agent, or Firm* — Trevor G. Grove

(57) ABSTRACT

A computer-implemented method for determining elastic properties for a heterogeneous anisotropic geological formation is described herein. The method includes grouping sonic velocity data from a borehole section (or borehole sections) into a number of clusters (e.g., one or more clusters). The sonic velocity data is grouped into clusters using petrophysical log data from the borehole section. The method also includes inverting the sonic velocity data for the clusters to determine elastic properties for each cluster. In some cases, the elastic properties for the clusters are combined to determine a relationship between the elastic properties and formation heterogeneity.

28 Claims, 10 Drawing Sheets

(51) Int. Cl.
*G01V 1/48* (2006.01)
*G01V 99/00* (2009.01)
*G06N 7/00* (2006.01)

(56) References Cited

U.S. PATENT DOCUMENTS

| | | | |
|---|---|---|---|
| 5,214,613 | A | 5/1993 | Esmersoy |
| 5,808,963 | A | 9/1998 | Esmersoy |
| 6,714,480 | B2 | 3/2004 | Sinha et al. |
| 7,913,775 | B2 | 3/2011 | Jeffryes et al. |
| 8,175,807 | B2 | 5/2012 | Suarez-Rivera et al. |
| 2002/0166699 | A1* | 11/2002 | Evans .............. E21B 47/0002 175/26 |
| 2003/0167835 | A1 | 9/2003 | Sinha et al. |
| 2004/0059513 | A1* | 3/2004 | Bittar .............. G01V 3/38 702/7 |
| 2006/0031017 | A1* | 2/2006 | Mathieu .............. G01V 3/20 702/6 |
| 2007/0143020 | A1* | 6/2007 | Bradford .............. E21B 47/026 702/6 |
| 2008/0137478 | A1 | 6/2008 | Sollner |
| 2008/0236270 | A1 | 10/2008 | Denichou et al. |
| 2009/0210160 | A1 | 8/2009 | Suarez-Rivera et al. |
| 2011/0106514 | A1* | 5/2011 | Omeragic .............. G01V 11/00 703/10 |
| 2011/0174541 | A1* | 7/2011 | Strachan .............. E21B 44/00 175/27 |
| 2012/0078600 | A1 | 3/2012 | Horne et al. |
| 2012/0293178 | A1* | 11/2012 | Proett .............. G01V 3/18 324/333 |
| 2013/0163375 | A1 | 6/2013 | Tulett |

OTHER PUBLICATIONS

Inversion for anisotropy from non-double-couple components of moment tensors, by Vavrycuk, 2004.*
Multivariate Analysis of Cross-Hole Georadar Velocity and Attenuation Tomograms for Aquifer Zonation, by Tronicke, 2004.*
Prediction of the s-wave velocity in carbonate formation using joint inversion of conventional well logs, by Kazatchenko, 2006.*
Efficient three-dimensional data inversion: Soil characterization and moisture monitoring from cross-well ground-penetrating radar at a Vermont test site, by ERppstein, 1998.*
Rocks Matter: Ground Truth in Geomechanics, by Cook, 2007.*
Analysis of Data from CRP-2/2A, Victoria Land Basin, Antarctica: a Multivariate Statistical Approach, by Bucker, 2000.*
Anisotropy correction for deviated-well sonic logs: Application to sonic well tie, by Hornby, published 2003.*
Ray-Kirchhoff multicomponent borehole seismic modelling in 3D heterogeneous, anisotropic media, by Druzhinin, published 2004.*
V. Pistre, et al., "A new Modular Sonic Tool Provides Complete Acoustic Formation Characterization," Expanded Abstracts, 75th SEG Annual International Meeting, 1-4 (2005).
R. Burridge, et al., "Tube Waves, Seismic Waves and Effective Sources," Wave Motion, vol. 18, Issue 2, pp. 163-210 (1993).
S. Chi, et al., "Stoneley-Wave Speed Modelinv in General Anisotropic Formations," SEG Int'l Exposition and 74th Annual Meeting, Denver, Colorado, Oct. 10-15, 2004.
R. Prioul, et al., "Theoretical Estimate of the Tube-Wave Modulus in Arbitrarily Anisotropic Media: Comparisons between Semi-Analytical, FEM and Approximate Solutions," 2012 SEG SEG Las Vegas 2012 Annual Meeting, pp. 1-6.
Hornby, Howie & Ince, "Anisotropy correction for deviated-well sonic logs: Application to seismic well tie," Geophysics, vol. 6, No. 2, 2003, pp. 464-471.
B.E. Hornby, et al., "Anisotropy Correction for Deviated Well Sonic Logs: Application to Seismic Well Tie," SEG 1999 Expanded Abstracts.
L.E. Jones, et al., "Ultrasonic velocities in Cretaceous shales from the Williston basin," Geophysics, pp. 288-297.
S.M. Luthi, "Geological well logs: their use in reservoir modeling," 2000 Springer.
G. Mavko, T. Mukerji, J. Dvorkin, "The Rock Physics Handbook," Cambridge University Press.
A.N. Norris, B.K. Sinha, "Weak elastic anisotropy and the tube wave," Geophysics, vol. 58, No. 8, 1993 pp. 1091-1098.
J.F. Nye, "Physical properties of crystals," 1985, Oxford University Press.
M.H. Sadd, "Elasticity—Theory, Applications, and Numerics," Elsevier.
C.M. Sayers, "Seismic anisotropy of shales," Geophysical Prospecting, vol. 53, Issue 5, pp. 667-676.
A. Thomsen, "Weak elastic anisotropy," Geophysics, vol. 51, No. 10, Oct. 1986, pp. 1954-1966.
I. Tsvankin, "P-wave signatures and notation for transversely isotropic media: An overview," Geophysics, vol. 61, No. 2, 1996, pp. 467-483.
M.D. Zoback, "Reservoir geomechanics," Cambridge University Press.
Anne-Kari Furre, et al, "Deriving effects of pressure depletion on elastic framework moduli from sonic logs," Geophycal prospecting, vol. 57, No. 3, Oct. 18, 2008, pp. 427-437.
W. Rabbel, et al., "Superdeep vertical seismic profiling at the KTB deep drill hole(Germany): Seismic close-up view of a major thrust zone down to 8.5 km depth," Journal of Geophysical Research, vol. 109, No. B9, Sep. 30, 2004, pp. 1-20.
European search report for the equivalent European patent application No. 13740671.6 issued on Nov. 3, 2015.

* cited by examiner

US 9,659,252 B2

METHOD TO CHARACTERIZE HETEROGENEOUS ANISOTROPIC MEDIA

PRIORITY

The present application claims the benefit of U.S. Application Ser. No. 61/589,710, filed Jan. 23, 2012, which application is incorporated herein, in its entirety, by reference.

TECHNICAL FIELD

This disclosure relates to the characterization of heterogeneous anisotropic geological formations, and more particularly to the characterization of elastic properties of these formations.

BACKGROUND

Anisotropy refers to a medium with properties that depend on a direction of measurement. In one example, the speed of acoustic waves that travel through an elastically anisotropic medium will vary depending on wave propagation direction and polarization direction (e.g., direction of particle displacement by a propagating elastic wave). Heterogeneity is defined as a variation of a property with location (e.g., variation of acoustic velocities with spatial coordinates as a result of variation of clay volume with spatial coordinates).

The presence of elastic anisotropy can have significant and relevant implications. For instance, subsurface stresses in elastically anisotropic media can be very different (e.g., both in magnitude and direction) from those existing in elastically isotropic media. Subsurface stress magnitude and orientation are important pieces of information for completion design (e.g., hydraulic fracturing) in unconventional reservoirs, such as gas shales. In seismic studies, if unaccounted for, the presence of elastic anisotropy in formations can lead to errors in time-to-depth conversion, normal moveout (NMO) correction, dip moveout (DMO) correction, migration, and amplitude versus offset (AVO) analysis.

SUMMARY

Illustrative embodiments of the present disclosure are directed to a computer-implemented method for determining elastic properties for a heterogeneous anisotropic geological formation. The method includes grouping sonic velocity data from a borehole section (or borehole sections) into a number of clusters (e.g., ore or more clusters). The sonic velocity data is grouped into clusters using petrophysical log data from the borehole section. The method also includes inverting the sonic velocity data for the clusters to determine elastic properties for each cluster.

In one example, the sonic velocity data is inverted using a misfit-norm-based iterative process.

Also, in some cases, the elastic properties for the clusters are combined to determine a relationship between the elastic properties and formation heterogeneity.

In some embodiments, the elastic properties include five elastic properties, such as three Thomsen parameters and two velocities. In other embodiments, the elastic properties include components of elastic stiffness tensors, components of elastic compliance tensors, or elastic Young's moduli and Poisson's ratios. The elastic properties can also be density normalized. In some cases, the elastic properties are independent of each other, while, in other cases, the elastic properties are dependent on each other.

In various embodiments, the method also determines uncertainty parameters for each of the elastic properties. The uncertainty parameters can be determined using a Bayesian probability method. The uncertainty parameters may include posterior probability distribution functions for each of the elastic properties. Also, the uncertainty parameters may include posterior probability distribution functions for combinations of elastic properties.

In some cases, the anisotropic formation is transversely isotropic. The method may further include determining a dip azimuth and a dip angle of a transverse isotropic plane for the transversely isotropic formation. The dip azimuth and dip angle of the formation can be determined from borehole image logs for the borehole section. The method may also include determining borehole azimuth and borehole deviation for the borehole section. Using this information, a relative dip angle between an axis of the borehole section and the transverse isotropic plane can be determined. The dip angle, in turn, can be used in the inversion process described above.

In exemplary embodiments, the petrophysical log data may include gamma ray measurements, density measurements, clay volume measurements, porosity measurements, resistivity measurements, and/or mineralogical measurements.

The embodiments described above may be implemented as instructions, which, when loaded on a computer, establish processes for determining a plurality of elastic properties for a heterogeneous anisotropic geological formation. These instructions can be encoded onto a non-transitory computer readable medium or stored on a memory within a computer system.

BRIEF DESCRIPTION OF THE DRAWINGS

Those skilled in the art should more fully appreciate advantages of various embodiments of the present disclosure from the following "Description of Illustrative Embodiments," discussed with reference to the drawings summarized immediately below.

DESCRIPTION OF ILLUSTRATIVE EMBODIMENTS

Figure 1:
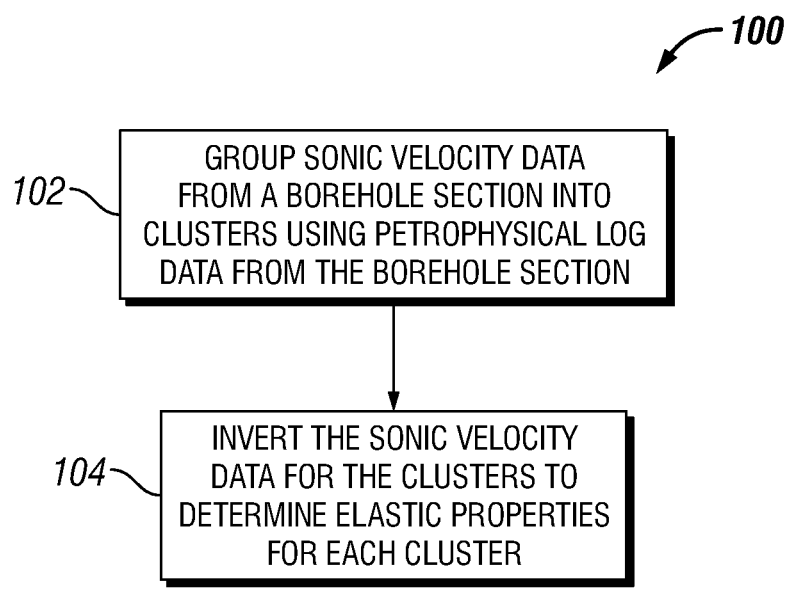
FIG. 1 shows a method for determining elastic properties of an anisotropic formation, in accordance with one embodiment of the present disclosure.

Illustrative embodiments of the disclosure are directed to a method, system, and computer readable medium that determines a plurality of elastic properties for a heterogeneous anisotropic geological formation. In one example, these elastic properties include three Thomsen parameters and two velocities. FIG. 1 shows a method 100 for determining the elastic properties. In process 102 of the method, sonic velocity data from a borehole section is grouped into a number of clusters (e.g., one or more clusters). The sonic velocity data is grouped using petrophysical log data from the borehole section (e.g., on the basis of porosity, resistivity, gamma ray, bulk density, mineralogical, and/or clay volume measurements). The sonic velocity data and the petrophysical log data can be acquired from a wireline or logging-while-drilling (LWD) operation that investigates the borehole section. At process 104, the sonic velocity data is inverted for one or more cluster to determine an estimate for the elastic properties for each cluster. In some embodiments, the elastic properties for each cluster are combined to determine a relationship between the elastic properties and formation heterogeneity (e.g., determine the elastic properties as a function of porosity, resistivity, gamma ray, bulk density, mineralogical, and/or clay volume measurements). In yet another exemplary embodiment, the method also determines uncertainty parameters for each of the estimated properties. In this manner, illustrative embodiments of the disclosure can be used to advantageously estimate elastic properties for a heterogeneous anisotropic geological formation, while also providing a measure of confidence for each estimate. Details of various embodiments are discussed below.

Figure 2:
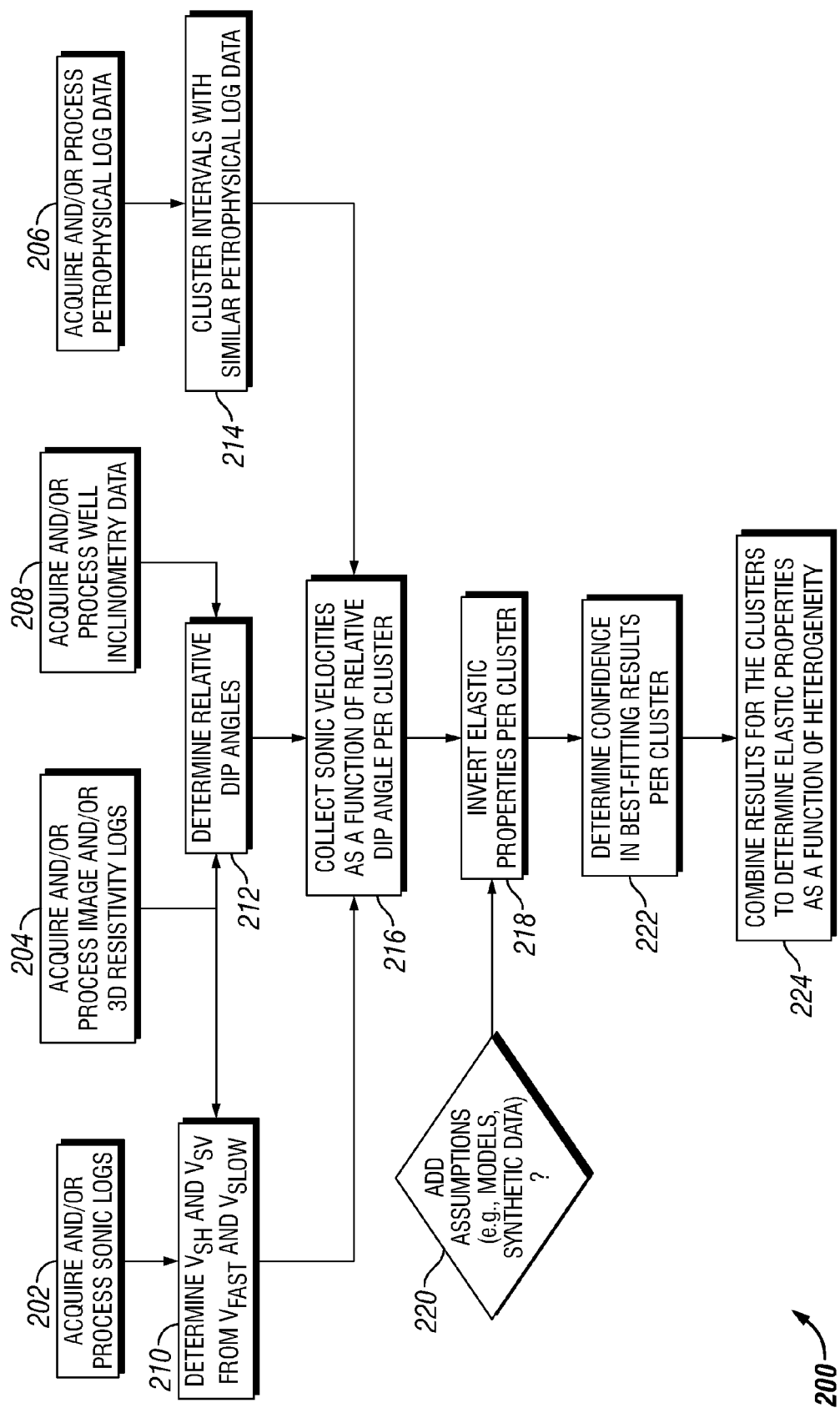
FIG. 2 shows a method for determining elastic properties of an anisotropic formation, in accordance with another specific embodiment of the present disclosure.
Figure 3:
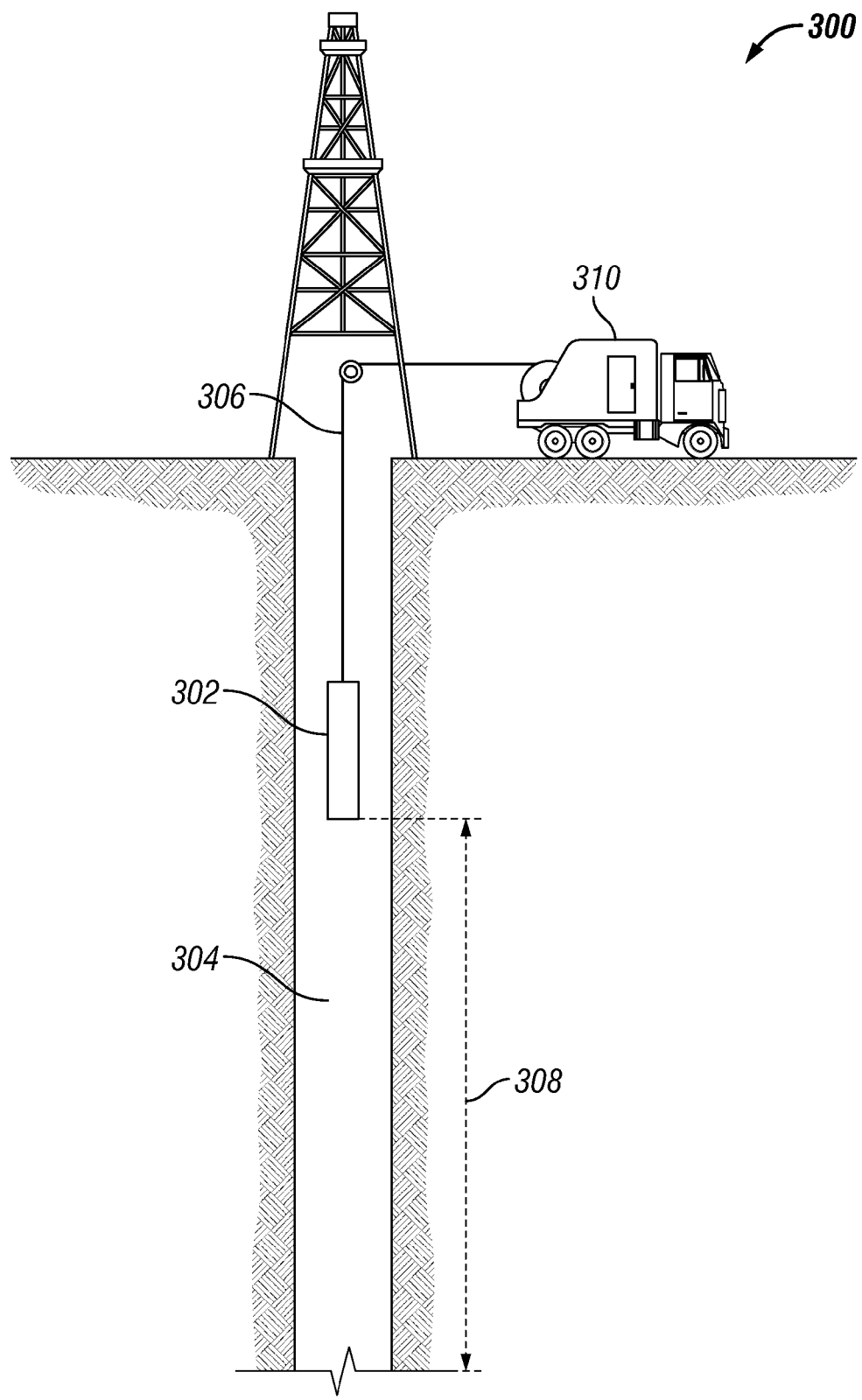
FIG. 3 shows a wireline logging system at a well site.

FIG. 2 shows a specific method 200 for determining a plurality of elastic properties for a heterogeneous anisotropic formation. The method includes acquiring formation data along a borehole section that traverses, for example, a hydrocarbon reservoir. The data can be acquired using a wireline logging system. FIG. 3 shows one example of a wireline logging system 300 at a well site. In this example, a wireline tool 302 is lowered into the borehole 304 using a cable 306. The wireline tool 302 is lowered down along a borehole section 308 and makes a number of measurements at a plurality of depths along the borehole section. The measurements may include sonic, porosity, resistivity, gamma ray, density, mineralogical, and clay volume measurements, as well as ultrasonic images and resistivity images. The data from these measurements is communicated through the cable 306 to surface equipment 310, which may include a computer system for storing and processing the formation data. In this case, the surface equipment includes a truck that supports the wireline tool 302. In another embodiment, however, the surface equipment may be located within a cabin on an off-shore platform.

The method described herein is not limited to any particular system or borehole tool for acquiring formation data. For example, in additional or alternative embodiments, a logging-while-drilling (LWD) system can be used to acquire the formation data.

The method described herein is also not limited to any particular type or types of formation data. The following is a non-limiting list of data that can be acquired:

Wireline and/or LWD sonic log data, such as monopole, dipole, quadrupole data and/or higher order sonic mode data (202);

Wireline and/or LWD image log data, such as ultrasonic image log data and/or electrical image log data (e.g., 3D resistivity image logs) (204);

Wireline and/or LWD petrophysical log data, such as gamma ray log data, neutron log data, density log data, mineralogy log data, clay volume log, porosity log data, and/or resistivity log data (206); and/or Well orientation and/or borehole tool orientation data (e.g., deviation and/or azimuth) that is obtained from inclinometry data. Such inclinometry data may be based on three angles (e.g., a borehole azimuth, a borehole deviation, and an azimuthal position around an axis of the borehole tool). The inclinometry data can be obtained from one or more magnetometers, one or more accelerometers, and one or more inclinometers within the borehole tool. Furthermore, the log data listed above can include inclinometry data (e.g., inclinometry data can be provided for each measurement within the log data) (208).

The formation data can be obtained from a number of different sections within a number of different boreholes. For example, the formation data can be obtained from a vertical well, as shown in FIG. 3, and/or from a deviated well. Furthermore, the formation data can be obtained from a single continuous section of a single well. In another embodiment, however, the formation data is obtained from a plurality of discontinuous sections within a single well. In yet another embodiment, the formation data is obtained from a number of different sections within a number of different wells.

In illustrative embodiments, the method processes the acquired sonic log data to determine sonic velocity data for the formation. In a specific embodiment, the sonic log data at each depth of the section (e.g., monopole and dipole data) is processed to determine sonic velocity data at each depth. The sonic velocity data may include a combination of (1) compressional velocity (e.g., monopole compressional velocity), (2) one or two different dipole shear velocities (e.g., a fast shear velocity and a slow shear velocity), and/or (3) a Stoneley shear velocity. This processing can be performed using known methods. An existing multimode sonic tool that acquires monopole compressional waves, monopole shear waves, dipole flexural waves, and monopole Stoneley waves is described in, for example, Vivian Pistre et al., A new Modular Sonic Tool Provides Complete Acoustic Formation Characterization, Expanded Abstracts, 75th SEG Annual International Meeting, 1-4 (2005). The monopole and dipole flexural sonic modes are used to obtain one compressional velocity and two shear velocities in the borehole of interest using known techniques, as described in, for example, U.S. Pat. No. 4,594,691 issued on Jun. 10, 1986; U.S. Pat. No. 5,214,613 issued on May 25, 1993; and U.S. Pat. No. 5,808,963 issued on Sep. 15, 1998.

In some embodiments, the method also processes image log data to determine characteristics of the formation. For example, a structural analysis of the image log data is performed to extract geometrical properties and morphology properties for bedding planes and layers within the formation. This analysis can be performed using known methods, as described in Stefan M. Luthi, Geological Well logs: Their Use in Reservoir Modeling, Springer, 2001. The determination of the geometrical properties of the beddings and layers may include determining a location and/or an orientation for an ideal-plane representation of the beds and layers within the formation. These beds and layers can be defined by depth, dip angle, and dip azimuth. Additionally or alternatively, the geometrical properties of the beddings and layers can be obtained from analysis of an electrical resistivity log. Furthermore, in some embodiments the geometrical properties of the beddings and layers are assumed (e.g., layers within the formation are orthogonal to the borehole).

In further embodiments, additional structural geology features can be identified and characterized in terms of orientation. For example, one or more natural fractures or induced fractures can be characterized. Such structural geology data can be used to assess the type of symmetry of the elastic medium. For example, a finely laminated medium may be identified as transversely isotropic, two orthogonal fracture sets may be identified as orthorhombic, two non-orthogonal fracture sets may be identified as monoclinic, and other geological features may be characterized down to the lowest symmetry (e.g., triclinic).

In various embodiments, the method further processes petrophysical log data to calculate formation characteristic data, such as porosity, resistivity, gamma ray, bulk density, clay volumes, and mineralogical volumes (e.g., sand, shale, and carbonate). This processing identifies various different lithologies within the formation. For example, neutron log data can be used to determine rock porosity at a number of different depths (and lithologies) within the section of the borehole. The petrophysical log data includes such calculated formation characteristic data (e.g., one of porosity, resistivity, gamma ray, bulk density, mineralogical, clay volume measurements, or combinations thereof). Known methods can be used to process the petrophysical log data to determine such formation characteristics.

In some embodiments, the inclinometry data can also be processed to determine well orientation data (e.g., deviation and azimuth) as a function of depth within the borehole.

Figure 4:
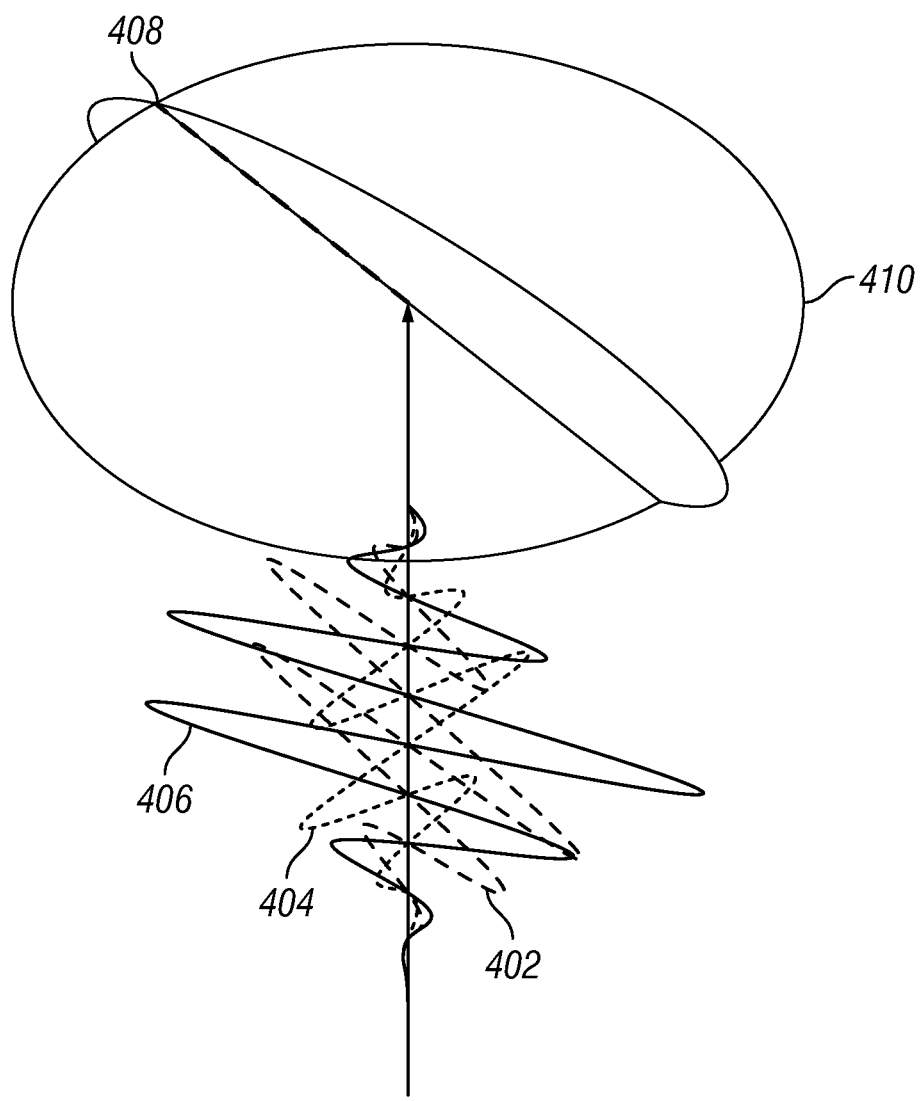
FIG. 4 shows a SH-shear wave component and a SV-shear wave component of a shear wave propagating vertically through an inclined structure.

As shown in FIG. 2, the sonic velocity data is further processed so that the data can be inverted using an inversion algorithm. The inversion algorithm is used to determine the elastic properties of the formation. In particular embodiment, the method determines SH-shear velocity and SV-shear velocity from a fast shear velocity and a slow shear velocity 210. FIG. 4 schematically shows an SH-shear wave component 402 and SV-shear wave component 404 of a shear wave 406 propagating vertically through an inclined structure. The SH-shear wave component 402 is polarized along an orientation of an intersection 408 between (1) the bedding and/or layer planes and (2) a plane orthogonal 410 to the borehole tool. If the FSA corresponds with the direction (e.g., azimuth) of the intersection 408, then the SH-shear velocity corresponds to the fast shear velocity, while the SV-shear velocity corresponds to the slow shear velocity. If the FSA is approximately ninety degrees from the intersection, then the SV-shear velocity corresponds to the fast shear velocity, while the SH-shear wave velocity corresponds to the slow shear velocity. In various embodiments, the SH-shear velocity and SV-shear velocity is determined using an analysis based on (1) an orientation of the borehole, (2) an orientation of the beds and/or laminations within the formation, and (3) a sonic fast-shear azimuth (FSA), which is defined as the polarization direction for the fastest of the two (fast and slow) shear waves. This analysis can be performed as described in, for example, U.S. Pat. No. 5,214,613 issued on May 25, 1993. The relationship between dipole shear fast velocity and dipole shear slow velocity versus SH-shear velocity and SV-shear velocity is determined because, in some embodiments, the subsequent inversion algorithm uses SH-shear velocity and SV-shear velocity.

In some embodiments, the method also determines a relative dip angle for each depth 212. This dip angle is used by the inversion algorithm to determine elastic properties of the anisotropic formation. The relative dip angle is the angle between the wellbore and a transverse isotropy symmetry axis. For example, for a transversely isotropic formation such as shale or a finely laminated formation, the symmetry axis is assumed to be perpendicular to the shale beds or laminations. Thus, a vertical well drilled through horizontal shale beds results in measurements at zero degrees relative dip angle, while a horizontal well drilled through the same shale will result in measurements made at 90 degrees relative dip angle. The relative dip angle can be calculated in a straightforward manner on the basis of the well orientation (e.g., assumed or measured from inclinometry data) and the bedding, shale, and/or lamination orientation (e.g., assumed or measured from image log data). The relative orientation of the borehole with respect to symmetries of an elastic formation, other than a transversely isotropic formation, can also be defined for each case and estimated accordingly.

In some cases, other characteristics of the formation (aside from elastic anisotropy) contribute to observed changes in elastic sonic velocities along the section of the borehole. For example, the elastic properties of formations often also depend on other formation characteristics, such as clay volume, clay type, density, fluid saturation, and depth (e.g., compaction). In order to separate the effects of elastic anisotropy from such characteristics, the sonic velocity data is grouped into clusters (e.g., bins) on the basis of the petrophysical log data 214. The sonic velocity data is grouped so that sonic velocity data measured within similar parts of the formation are grouped together. In one example, sonic log data are grouped into clusters with similar formation densities. In another embodiment, the sonic velocity data are grouped into clusters with similar clay volumes. In yet another embodiment, the sonic velocity data are grouped into clusters based on a combination of both formation density and clay volume. Other petrophysical log data, such as depth, gamma ray, and porosity measurements, can also be used to group the sonic velocity data. In general, the method uses petrophysical log data that is expected to have an impact on elastic wave propagation velocities, such as clay volume and porosity. The process of grouping sonic velocity data into clusters on the basis of independent formation characteristic data is performed so that the inversion algorithm determines meaningful inversion results (e.g., elastic properties of the formation).

In various embodiments, the method generates one or more clusters that each includes sonic velocity data (e.g., compressional velocity, SH-shear velocity, SV-shear velocity, and/or Stoneley shear velocity) as a function of relative dip angle. Sonic velocity data (and its corresponding relative dip angles) at various depths within the borehole section are collected and grouped according to limits for each particular cluster 216. The sonic velocity data in a particular cluster is common with respect to at least one characteristic of the formation, such as formation density. For example, if the limits of one cluster are set at a formation density between 2.0 and 2.1, then, at borehole depths in which the density measurement is within those cluster limits, the sonic velocity data is collected and grouped into that particular cluster. This process is repeated for other adjacent clusters (e.g., for a cluster with a density between 2.1 and 2.2). In this manner, the sonic velocity data from the borehole section is "sorted" according to the petrophysical log data. In one specific embodiment, the number of clusters generated by the method is in a range between 10 and 1000 clusters. The number of clusters can be selected so that the number of data points (e.g., sonic velocity data) within each cluster is statistically reliable. For example, the number of clusters can be selected so that (1) each cluster includes a minimum of at least two distinct relative dip angles and/or (2) each cluster includes at least 10 data points per mode (e.g., compressional velocity, SH-shear velocity, and SV-shear velocity).

As explained above, an inversion algorithm is used to determine the elastic properties of a heterogeneous anisotropic geological formation. The inversion algorithm described below is a specific example where the elastic properties for a formation with a transverse isotropic symmetry are determined. Such inversion algorithms may also be used to determine elastic properties for other anisotropic formations, such as formations with less symmetry. For example, the inversion algorithm may be used to determine elastic properties for orthorhombic, monoclinic, or triclinic formations.

Illustrative embodiments of the method can advantageously determine elastic properties for shale formations. Shale formations are a major component of sedimentary basins and play a significant role in fluid flow and seismic wave propagation because of low permeability and anisotropic microstructure. Shale formations exhibit anisotropic behavior due to constituent plate-shaped clay particles oriented (to some extent) parallel to each other. Most shale formations can be described, to a good approximation, as being transversely isotropic with an axis of symmetry that is usually assumed to be orthogonal to the shale bed.

The elastic properties that are determined by the inversion algorithm may include a number of different properties. In one example, the properties include five elastic stiffnesses for transversely isotropic formations. These five stiffnesses are defined as follows. For a linearly elastic medium, Hooke's law provides the relationship between the stress ($\sigma$) and strain ($\epsilon$) tensors:

$$\sigma_i = C_{ij}\epsilon_j, \quad (1)$$

where C is the stiffness tensor and where the abbreviated "Voigt" notation is used with two indices (i,j) taking each values from 1 to 6. Defined in a Cartesian reference frame, the elastic stiffness tensor C for a transversely isotropic medium is defined as:

$$C = \begin{pmatrix} C_{11} & C_{12} & C_{13} & 0 & 0 & 0 \\ C_{12} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{pmatrix}, \quad (2)$$

where the transverse isotropic symmetry axis is parallel to the $x_3$-axis of the Cartesian reference frame. Five of the six elastic stiffnesses in the above tensor are independent ($C_{11}$, $C_{33}$, $C_{13}$, $C_{44}$, $C_{66}$ while $C_{12}=C_{11}-2C_{66}$). These five elastic stiffnesses are elastic properties that can be determined by the method described herein. The stiffness tensor C may be inverted to obtain the compliance tensor S where the five independent properties are described with notation $S_{11}$, $S_{33}$, $S_{13}$, $S_{44}$, $S_{66}$.

An alternative notation for the properties of the transversely isotropic formation may also be determined. For example, the inversion algorithm may determine geophysical properties that include three dimensionless parameters ($\epsilon$, $\delta$, and $\gamma$) in addition to two velocities ($V_{p0}$ and $V_{s0}$), as defined in Leon Thomsen, Weak Elastic Anisotropy, Geophysics, 1954-1966 (1986). In another example, the inversion algorithm may determine geomechanical properties, such as vertical and horizontal Young's moduli ($E_v$ and $E_h$), vertical and horizontal Poisson's ratios ($v_v$ and $v_h$), and a shear modulus of a plane containing the transverse isotropic symmetry axis ($\mu_v$). For a transverse isotropic formation with a vertical axis of symmetry (e.g., horizontal shale beds), the geophysical properties and the geomechanical properties are related to the elastic stiffnesses C as shown in Table 1 below

TABLE 1

| Relation between Thomsen Parameters and Elastic Stiffnesses | |
|---|---|
| $V_{P0} = \sqrt{C_{33}/\rho}$ | Vertical P-wave velocity |
| $V_{S0} = \sqrt{C_{44}/\rho}$ | Vertical S-wave velocity |
| $\epsilon = (C_{11} - C_{33})/(2C_{33})$ | P-wave anisotropy |
| $\gamma = (C_{66} - C_{44})/(2C_{44})$ | S-wave anisotropy |
| $\delta = [(C_{13} + C_{44})^2 - (C_{33} - C_{44})^2]/[2C_{33}(C_{33} - C_{44})]$ | Small-offset NMO factor |
| Relation between Geomechanical Parameters and Elastic stiffnesses | |
| $E_v = C_{33} - 2C_{13}^2/(C_{11} + C_{12})$ | Vertical Young's modulus |
| $E_h = [(C_{11} - C_{12})(C_{11}C_{33} - 2C_{13}^2 + C_{12}C_{33})]/(C_{11}C_{33} - C_{13}^2)$ | Horizontal Young's modulus |
| $\mu_v = C_{44}$ | Vertical plane shear modulus |
| $\mu_h = C_{66}$ | Horizontal plane shear modulus |
| $v_v = C_{13}/(C_{11} + C_{12})$ | Vertical Poisson's ratio |

Since the stiffnesses (C), the geophysical properties ($\epsilon$, $\delta$, $\gamma$, $V_{P0}$ and $V_{S0}$), and the geomechanical properties ($E_v$, $E_h$, $v_v$, $v_h$ and $\mu_v$) are related to each other (e.g., through the expressions shown in Table 1), once an optimized set of five parameters in one domain has been determined (e.g., optimized values for the geophysical properties), these values can be transformed to the corresponding values in the other domains (e.g., the stiffnesses and/or geomechanical properties) provided that the bulk density of the rock is known. In a case where the bulk density is unknown, the relationship between geophysical properties and the other domains is determined using density-normalized elastic constants or density-normalized geomechanical properties. In FIGS. 5-9, the elastic properties determined from the inversion algorithm are shown as geophysical properties ($\epsilon$, $\delta$, $\gamma$, $V_{P0}$ and $V_{S0}$).

The inversion algorithm described below determines elastic properties for a transversely isotropic formation using a relationship between sonic phase velocities and the geophysical properties. In various other embodiments, the inversion algorithm may use equivalent relationships, such as (1) a relationship between (a) sonic phase velocities and (b) geomechanical properties and stiffnesses and/or (2) a relationship between (a) sonic group velocities and (b) geophysical properties, geomechanical properties, and elastic stiffnesses.

In one particular embodiment, the inversion algorithm performs two processes on each cluster. The two processes include an iterative process (e.g., a misfit-norm-based iterative process) followed by an optional probabilistic-based confidence analysis of the results of the iterative process.

The iterative process inverts the sonic velocity data in each cluster to determine elastic properties for each cluster 218. In various embodiments, the iterative process is a misfit-norm-based iterative process. Such an iterative process may also be referred to as a cost-function-based iterative process or a prediction-error-norm-based iterative process, an example of which is a root-mean-square (RMS) iterative process. The iterative process calculates predicted values for compressional velocity, SV-shear velocity, and SH-shear velocity for a large number of geophysical propisotropic formations from five to four or three. Assumptions may also be used in order to assess how additional data acquisition in existing offset wells or in planned wells will further constrain and improve the current estimate of the elastic properties.

In various embodiments, the iterative process calculates predicted sonic velocities at a number of relative dip angles for a given set of elastic properties. To this end, for each iteration, the iterative process may use the following relationships between the compressional phase velocity ($V_P$), the SV-shear phase velocity ($V_{SV}$), the geophysical properties ($\epsilon, \delta, \gamma, V_{P0}, V_{S0}$), and a particular relative dip angle ($\theta$):

$$V_P(\theta) = V_{PN0} \sqrt{1 + \epsilon \sin^2\theta - \frac{f}{2} + \frac{f}{2}\sqrt{\left(1 + \frac{2\epsilon \sin^2\theta}{f}\right)^2 - \frac{2(\epsilon - \delta)\sin^2 2\theta}{f}}} \quad (3)$$

$$V_{SV}(\theta) = V_{S0} \sqrt{1 + \epsilon \sin^2\theta - \frac{f}{2} - \frac{f}{2}\sqrt{\left(1 + \frac{2\epsilon \sin^2\theta}{f}\right)^2 - \frac{2(\epsilon - \delta)\sin^2 2\theta}{f}}} \quad (4)$$

where:

$$f \equiv 1 - \frac{V_{S0}^2}{V_{P0}^2},$$

erty combinations ($\epsilon, \delta, \gamma, V_{P0}, V_{S0}$) using the relative dip angles available in each cluster. In some embodiments, the Stoneley shear velocity is also calculated. The calculations are performed using an iterative process that includes multiple five-dimensional model space evaluations.

Prior to the first iteration of the iterative process, permissible lower and upper limits for the elastic properties (e.g., $\epsilon, \delta, \gamma, V_{P0}, V_{S0}$) are set. In some embodiment, the limits are defined by a user of the method. In one example, a Thomsen gamma property ($\gamma$) is set to lower and upper limits of respectively $\gamma(\min)=0$ and $\gamma(\max)=1$, and values for $\gamma$ between these limits are evaluated at increments ($\Delta\gamma$), while while the relationship for the SH-shear phase velocity ($V_{SH}$) is given by the following relationship:

$$V_{SH}(\theta) = V_{S0}\sqrt{1 + 2\gamma \sin^2\theta} \quad (5)$$

As explained above, for each model set of elastic properties the predicted sonic velocities ($V_P^P, V_{SV}^P, V_{SH}^P$) are computed using Equations 3, 4, and 5, after which they are compared with the measured sonic velocities ($V_P^M, V_{SV}^M, V_{SH}^M$). The agreement (e.g., or disagreement) between prediction and measurement is quantified using a misfit-norm function, such as a root-mean-square (RMS) misfit function. An example of a RMS misfit function is shown below:

$$\text{misfit} = \sqrt{\frac{\sum_{i=1}^{i=N}[(V_P^M(\theta_i) - V_P^P(\theta_i))^2 + (V_{SV}^M(\theta_i) - V_{SV}^P(\theta_i))^2 + (V_{SH}^M(\theta_i) - V_{SH}^P(\theta_i))^2]}{3N}} \quad (6)$$

keeping the other four elastic properties constant at values that fall within their respective permissible ranges.

Some combinations of elastic properties can be excluded because the combinations would violate strain energy considerations. Accordingly, in some embodiments, prior to being evaluated, each combination of model parameters is checked to ensure no strain energy considerations are violated.

Furthermore, in some embodiments, the sonic velocity data can be augmented with assumptions, such as model assumptions or synthetic data 220. In one example, based on physical or empirical considerations, one or several elastic properties may be related (e.g., may be dependent on each other). For example, one relationship may indicate that $C_{13}=C_{12}$ or $C_{13}=C_{33}-2C_{55}$. Various other relationships between elastic properties may also exist. Consequently, the number of independent elastic properties to be estimated by the inversion may be reduced, for example, for transverse where N is the total number of available measurements per mode and $\theta_i$ is the i-th available relative dip. The first iteration results in a five-dimensional RMS-misfit space from which the best-fitting set of elastic properties (e.g., the set resulting in the smallest RMS misfit) is determined and recorded.

Prior to the second iteration, new elastic property ranges are determined. The new ranges are centered about the previously determined best-fitting set of elastic properties. The new range widths are narrower as compared to the range widths of the previous iteration (e.g., 30% narrower). One factor that may influence the decrease in range widths and/or size of the increments (e.g., $\Delta\gamma$) is computational efficiency. In some embodiments, the decrease in range widths and/or size of the increments can be user defined. The second iteration results in an improved set of elastic properties. The second iteration is used to determine narrower elastic property ranges for a third iteration. In this manner, a number of iterations are performed for a single cluster. The iterative process is also repeated for a number of different clusters.

Figure 5A:
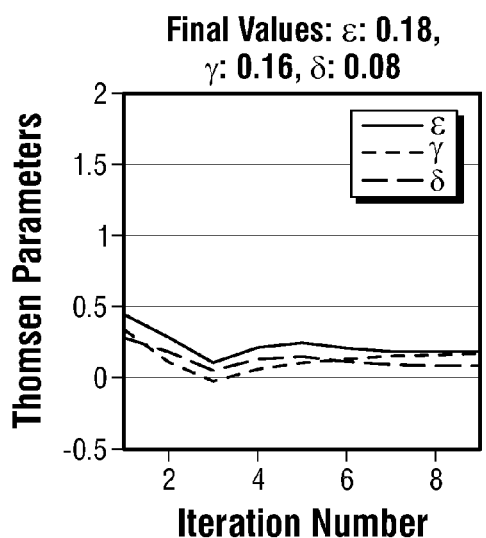
FIGS. 5A-5D show plots that were generated using a misfit-norm-based iterative process with a total of 9 iterations, in accordance with one embodiment of the present disclosure.
Figure 5B:
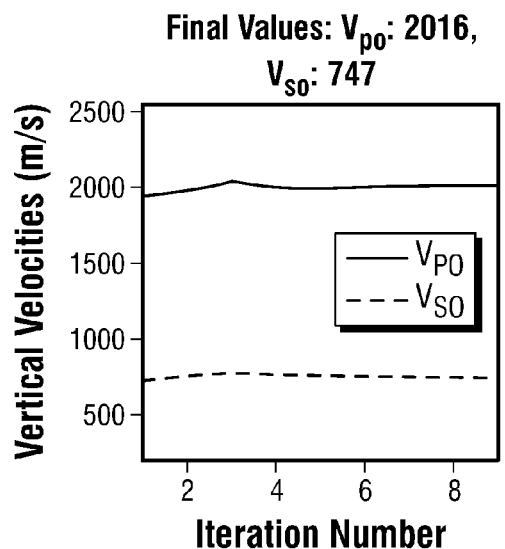
Figure 5C:
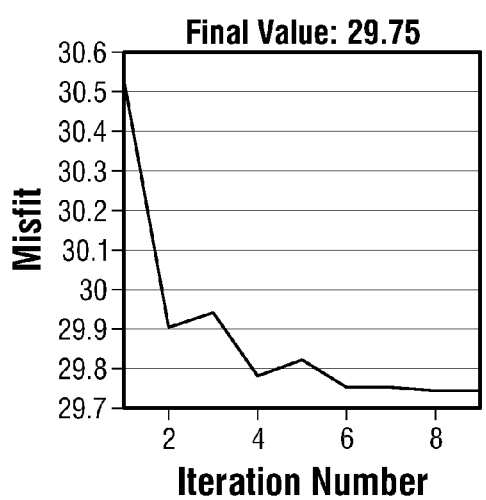
Figure 5D:
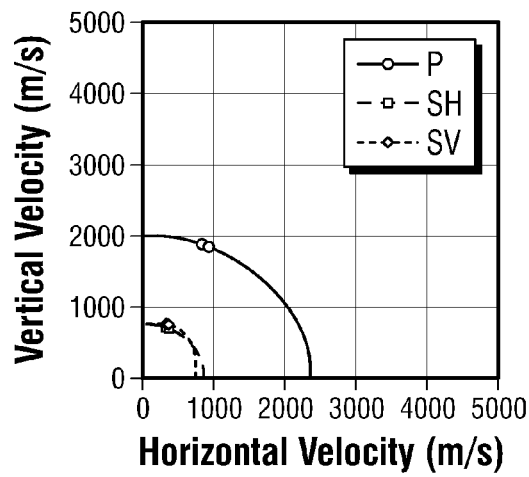

FIGS. 5A-5D shows plots that were generated using a misfit-norm-based iterative process with a total of 9 iterations. As shown in FIGS. 5A-5C, initially, the solutions for the elastic properties are unstable because of the large increments at which the properties are evaluated. After several iterations, the geophysical properties (e.g., Thomsen parameters ($\epsilon$, $\delta$, $\gamma$) in FIG. 5A and velocities ($V_{P0}$, $V_{S0}$) in FIG. 5B) begin to stabilize and the associated RMS misfit also begins to stabilize, as shown in FIG. 5C. In some cases, this stabilization occurs after 4 to 6 iterations. Accordingly, in some embodiments, the best-fitting set of elastic properties after 9 iterations is recorded as the final solution for the cluster. In this case, those values are shown at the top of FIGS. 5A and 5B. Also, FIG. 5D shows velocity curves over the full range of relative dips between 0 and 90 degrees that were calculated using the best-fitting set of elastic properties.

Aside from the compressional and two dipole shear wave velocities, some borehole logging tools can record Stoneley wave data that can be processed to obtain a fourth input into the inversion algorithm. This Stoneley-based velocity is usually referred to as the "horizontal shear" or the "Stoneley shear." The complex relationship between the horizontal shear and the elastic properties is described in, for example, Robert Burridge et al., Tube Waves, Seismic Waves and Effective Sources, Wave Motion, 163-210 (1993); Shihong Chi et al., Stoneley-Wave Speed Modeling in General Anisotropic Formations, Geophysics, F67 (2006); Florian Karpfinger et al., Theoretical Estimate of the Tube-Wave Modulus in Arbitrarily Anisotropic Media: Comparisons between Semi-Analytical, FEM and Approximate Solutions, Geophysics, D199-D208 (2012). As mentioned above, this Stoneley wave data can also be used by the inversion algorithm to determine elastic properties of an anisotropic formation.

In some embodiments, the inversion algorithm includes a second process that determines uncertainty parameters for each of the elastic properties to provide a measure of confidence in the results of the iterative process 222. In a particular embodiment, a confidence analysis is performed using a probabilistic method. In one such example, the probalistic method represents scatter in the sonic velocity data at each relative dip angle using a distribution (e.g., a normal "Gaussian" distribution with mean <V> and standard deviation $\sigma_V$). The velocity means are calculated per mode and per angle on the basis of the best-fitting set of elastic properties estimated during the final iteration of the iterative process. The standard deviation for each mode is equal to the RMS misfit during the final iteration of the iterative process. The model space in the vicinity of the best iteration model is explored in detail by independently varying the five elastic properties across a five-dimensional model space. Each candidate model yields a set of velocity curves that crosses with the Gaussian distributions of each mode at each angle. The likelihood of a candidate model is then quantified by the total probability, obtained by summing probabilities of the available modes at the available angles. One example of a probabilistic method that can be used by the inversion algorithm is a Bayesian probability method. By using the Bayesian probability method, the inversion algorithm can relate (1) the probability that a given set of elastic properties represents the formation given the measured sonic velocities (2) to the probability that the method would have observed the measurement data if the given set of elastic properties were correct. In mathematical terms, this relationship is expressed by the following equation:

$$P(m|d) \propto P(m) \times P(d|m) \qquad (7)$$

where m=($V_{P0}$, $V_{S0}$, $\epsilon$, $\delta$, $\gamma$) is the model vector and d is the data vector containing the measured velocities, for instance d=(VP($\theta$), VSH($\theta$), VSV($\theta$)) for the case where compressional (VP) and shear (VSH, VSV) velocities are available at relative dip angles $\theta$. In some embodiments, d=(VP($\theta$), VSt($\theta$), VSH($\theta$), VSV($\theta$)) for the case where Stoneley shear (VSt) is available. P(m) is the a-priori probability of the (theory) model vector m, P(m|d) is the a-posterior probability of model vector m given data d and P(d|m) is the likelihood probability. For the evaluation of the likelihood, the method may use a multivariate Gaussian distribution as representative of the scatter within the sonic velocity data:

$$P(d|m) = \exp\left[-\frac{1}{2}(d(m) - \langle d \rangle)^T \sum_{cov}^{-1} (d(m) - \langle d \rangle)\right] \qquad (8)$$

where $\langle d \rangle$ is a vector containing the means of the measured sonic velocities, d(m) are the theoretically calculated sonic velocities for a given model vector m consisting of a given combination of elastic properties (e.g., Thomsen parameters and velocities), and $\Sigma_{cov}$ is the covariance matrix. The combination of elastic properties that has the largest probability is presented as the most likely set of elastic properties for the anisotropic formation.

The confidence analysis can also use other probabilistic methods, such as a conditional probability method or a more general probability method (e.g., Tarantola's "combination of states of information" theory).

In various embodiments, the second process of the inversion algorithm results in a five-dimensional probability space. The corresponding uncertainties of the elastic properties (e.g., five elastic properties) can then be analyzed in a variety of ways. For example, integrating the probability space along four of the five property axes yields a marginal distribution of the fifth parameter (e.g., for $\gamma$):

$$P(\gamma|d) = \int_{\epsilon_{min}}^{\epsilon_{max}} \int_{\delta_{min}}^{\delta_{max}} \int_{V_{P0,min}}^{V_{P0,max}} \int_{V_{S0,min}}^{V_{S0,max}} P(m|d) dV_{S0} dV_{P0} d\delta d\epsilon \qquad (9)$$

Such marginal distributions are shown in FIGS. 6A-E and FIGS. 7A-E as broken lines for each of the five elastic parameters, while best-fitting Gaussian distributions through the marginal distributions are shown as solid lines. The marginal distribution of a single property represents a measure of the possible variation of the property, taking into account scatter in the sonic velocity data as well as likely variations in the other four elastic properties. The inversion algorithm fits the marginal distributions with, for example, a Gaussian distribution to yield the corresponding uncertainty parameters (e.g., standard deviations $\sigma$). Such uncertainty parameters will allow the user to properly assess risk and, in this manner, facilitate decision making.

Figure 6A:
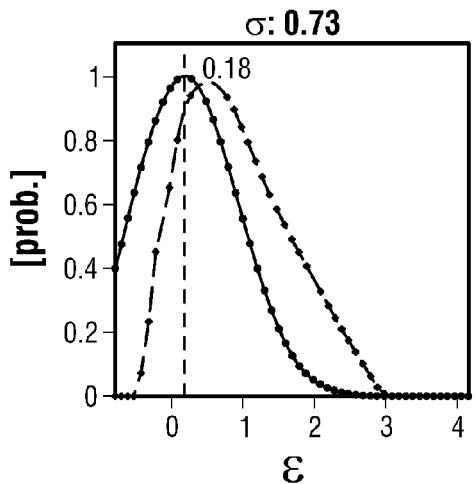
FIG. 6A-F show plots obtained from an inversion algorithm with an iterative process and a confidence analysis in accordance with one embodiment of the present disclosure.
Figure 6B:
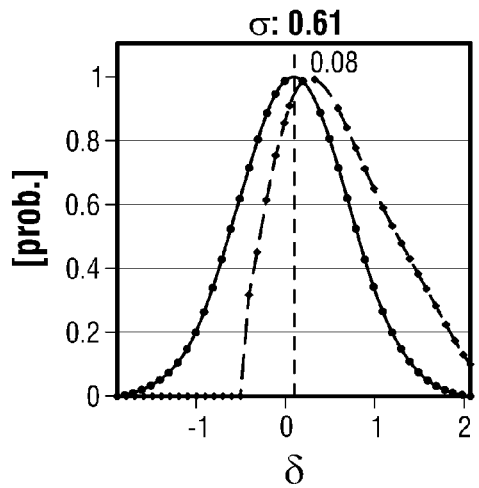
Figure 6C:
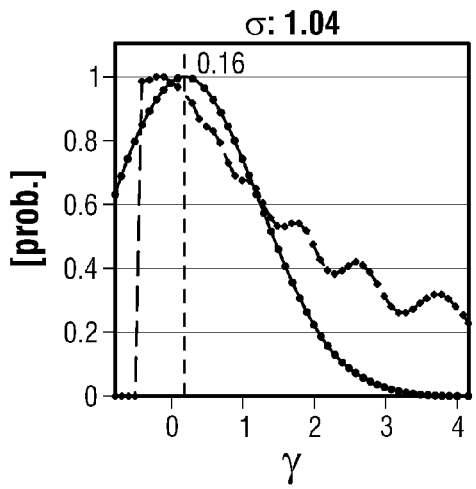
Figure 6D:
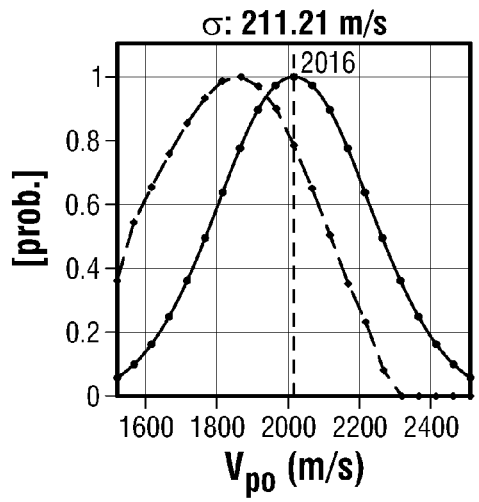
Figure 6E:
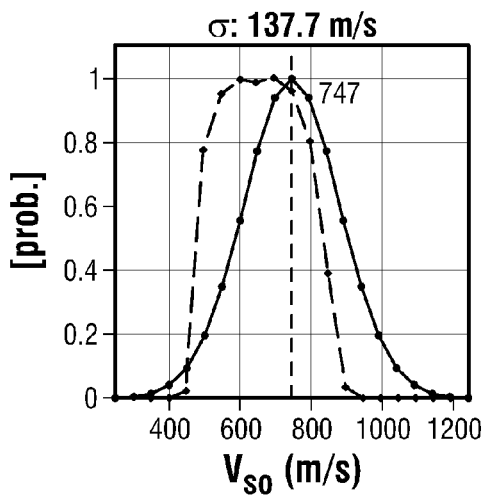
Figure 6F:
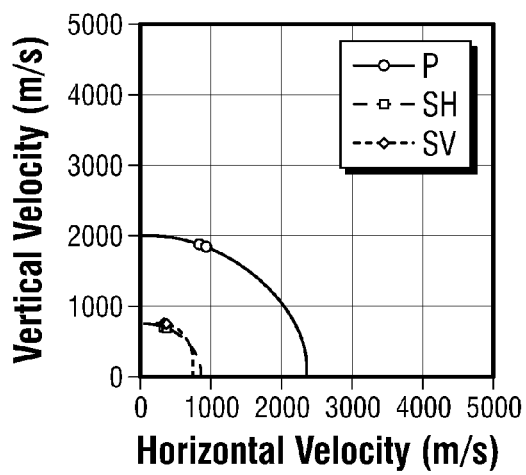
Figure 7A:
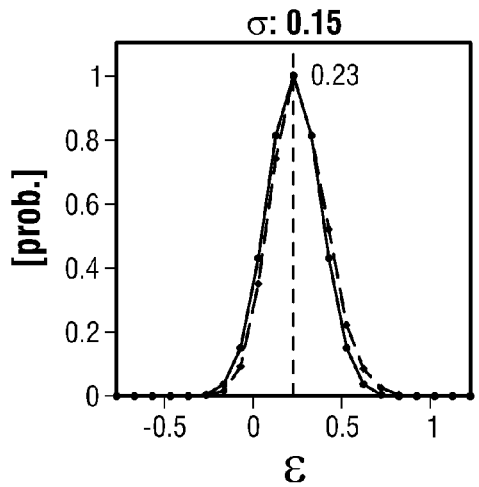
FIG. 7A-F show plots obtained from an inversion algorithm with an iterative process and a confidence analysis in accordance with another embodiment of the present disclosure.
Figure 7B:
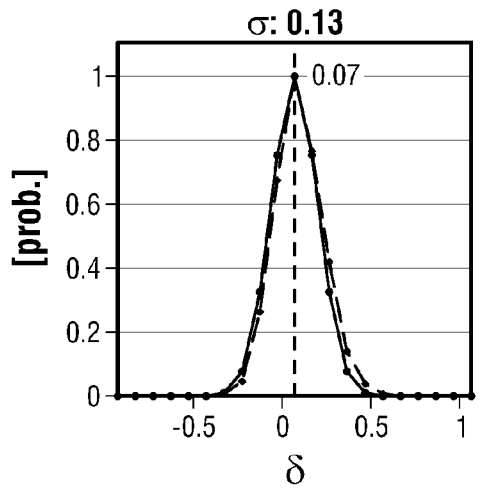
Figure 7C:
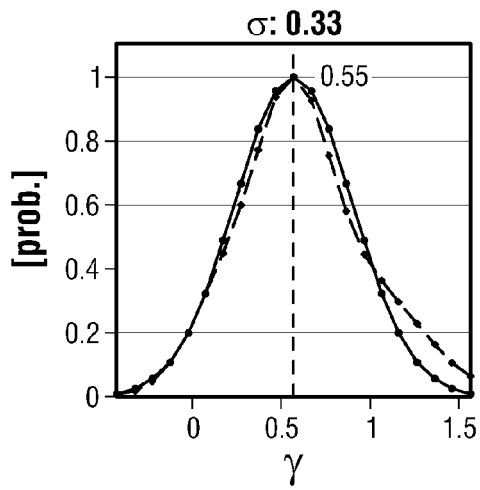
Figure 7D:
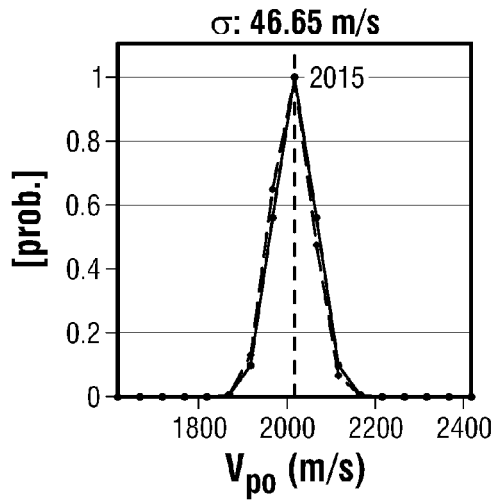
Figure 7E:
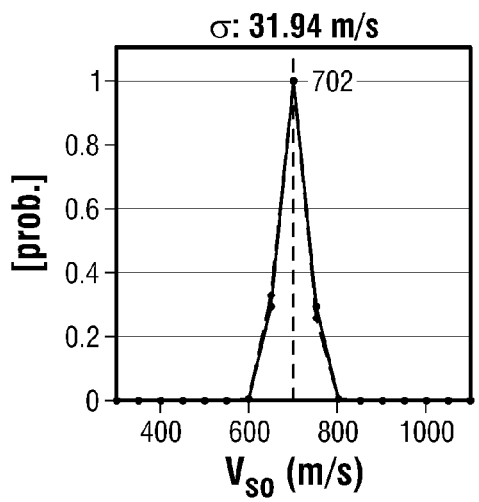
Figure 7F:
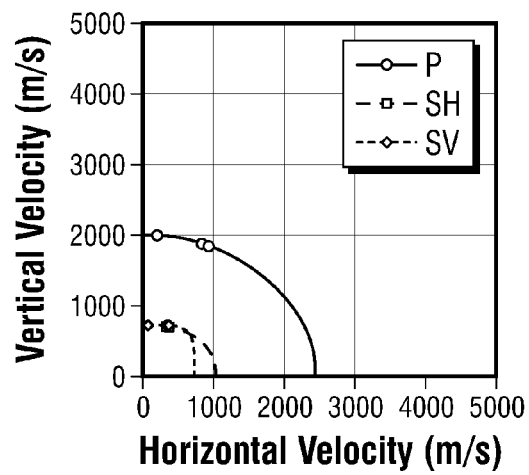

FIG. 6A-F show plots obtained from an inversion algorithm with an iterative process and a confidence analysis. The plots in FIGS. 6A-E show five elastic properties ($\epsilon$, $\delta$, $\gamma$, $V_{P0}$ and $V_{S0}$) with an indication of uncertainty (e.g., standard deviation $\sigma$) for each of the elastic properties. The plot in FIG. 6F shows a prediction of sonic velocities to be expected at arbitrary well deviations.

FIG. 7A-F show plots obtained from an inversion algorithm with an iterative process and a confidence analysis.

The plots in FIGS. 7A-E were obtained by combining data from FIGS. 6A-F with data from a semi-vertical offset well. The data from the semi-vertical offset well decrease the uncertainties for the inverted elastic properties ($\epsilon$, $\delta$, $\gamma$, $V_{P0}$ and $V_{S0}$) by a factor of four.

Figure 8A:
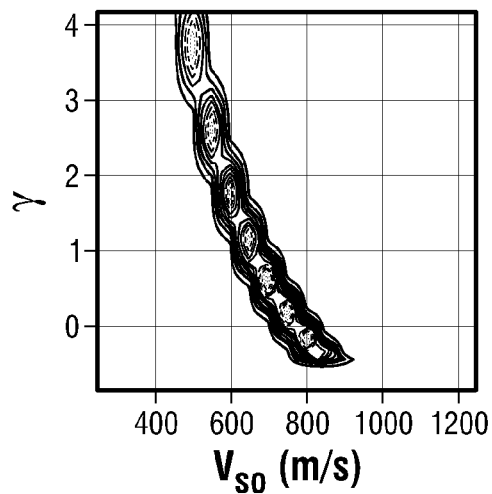
FIGS. 8A-I show plots that were created by integrating along three of five elastic property axes, in accordance with one embodiment of the present disclosure.
Figure 8B:
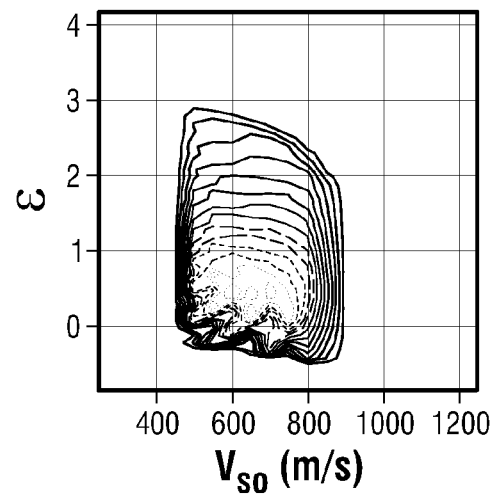
Figure 8C:
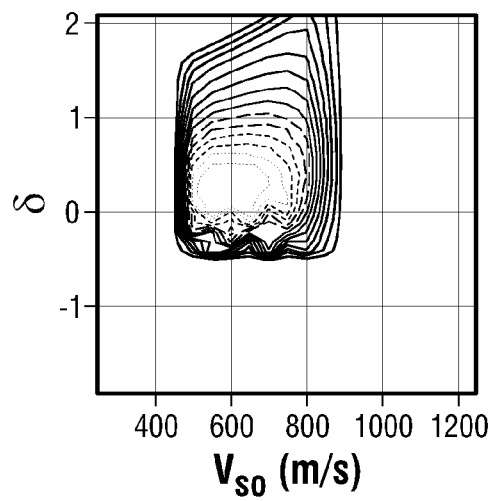
Figure 8D:
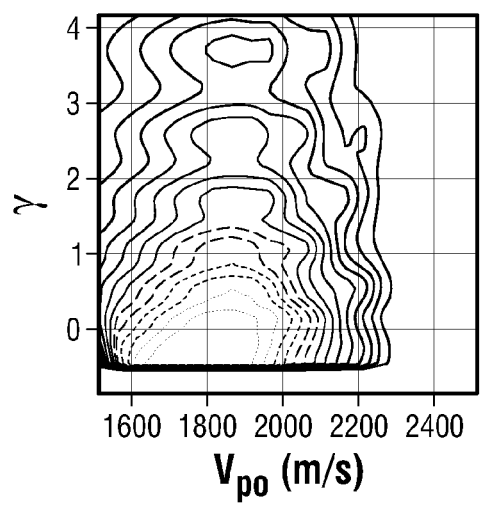
Figure 8E:
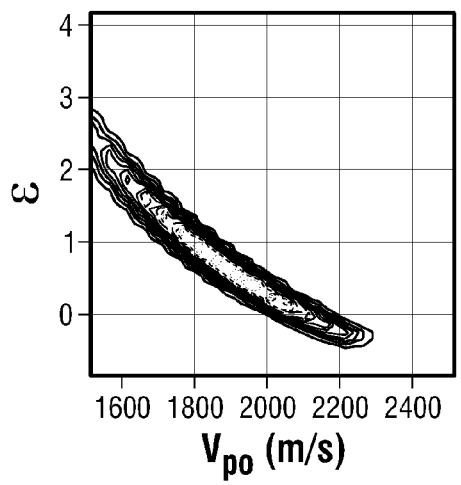
Figure 8F:
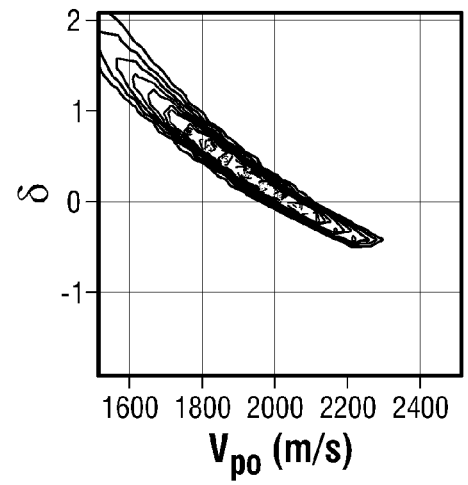
Figure 8G:
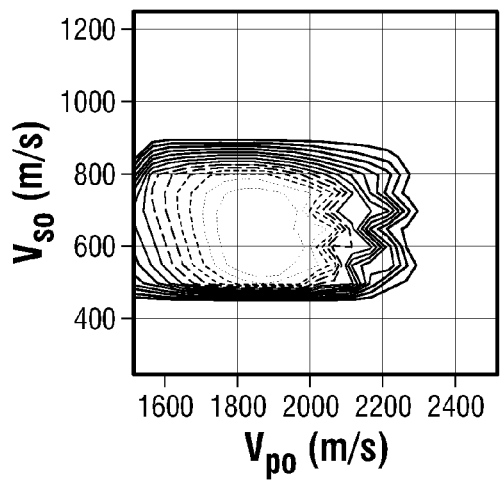
Figure 8H:
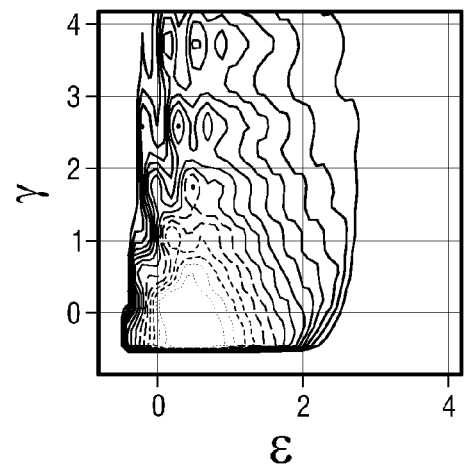
Figure 8I:
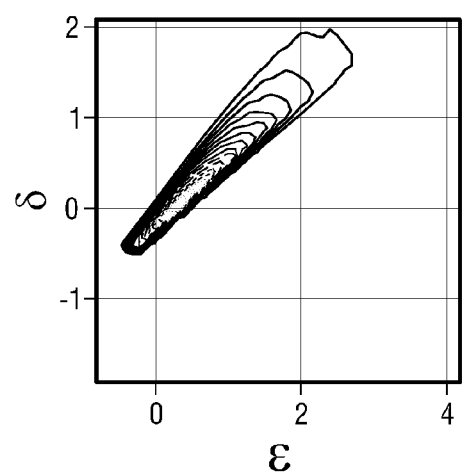

Alternatively or additionally, the probability space can be integrated along three of the five property axes, yielding insight into possible correlations between inverted elastic properties. FIGS. 8A-I show plots that were created by integrating along three of five elastic property axes. As shown in FIGS. 8A-I, for this particular cluster, some of the properties are uncorrelated (e.g., $V_{S0}$ versus $\epsilon$ FIG. 8B), whereas others are quite strongly correlated (e.g., an increase of $V_{P0}$ will likely be accompanied by a decrease in $\delta$ and $\epsilon$, as shown in FIGS. 8E and 8F).

Accordingly, in illustrative embodiments, the inversion algorithm determines the best-fitting set of elastic properties (e.g., Thomsen parameters and velocities) and the uncertainty parameters (e.g., the five standard deviations of the Thomsen parameters and velocities) for each cluster. If input data (e.g., sonic velocity data and relative dip angles) are sparse, then the standard deviations for the elastic properties may be large, as shown in FIGS. 6A-E. Inversely, if the iterative process is well-constrained, then the range of probable solutions will be narrow and the corresponding uncertainties small, as shown in FIGS. 7A-E.

Figure 9:
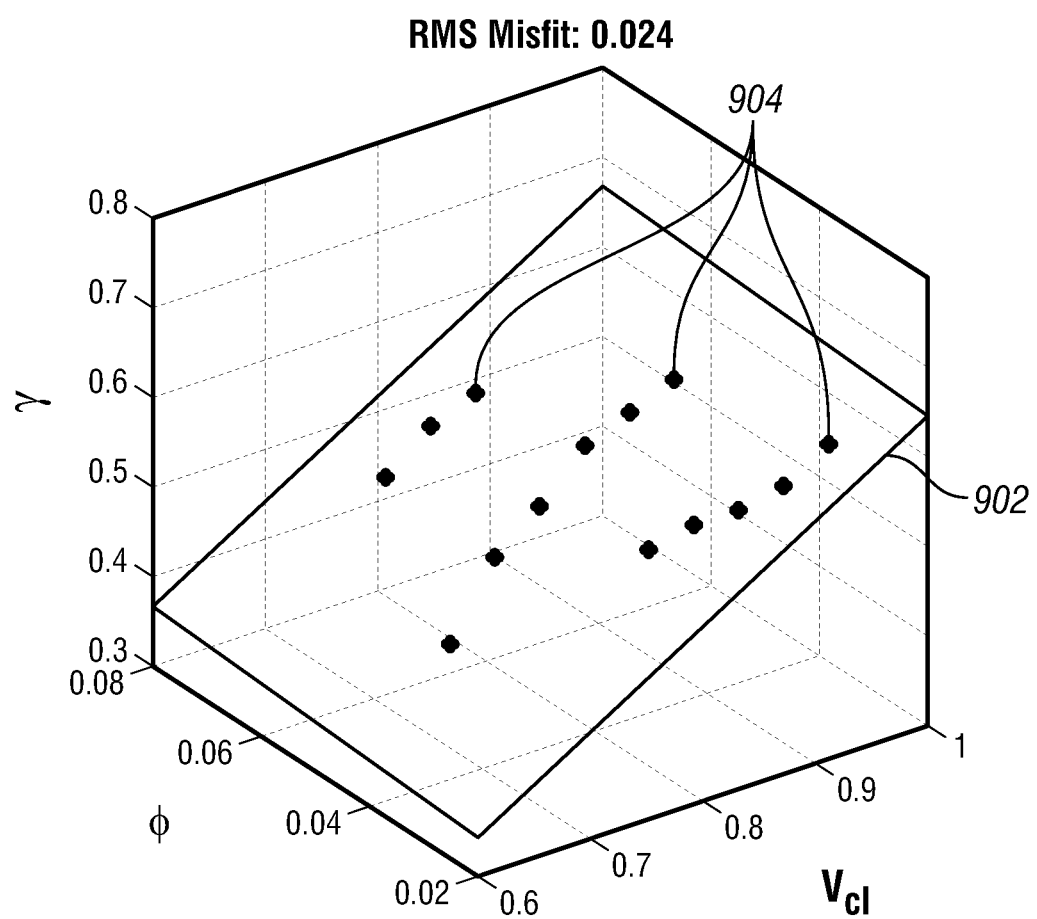
FIG. 9 shows a plot that was generated by combining inversion results for a plurality of clusters, in accordance with one embodiment of the present disclosure.

In illustrative embodiments, the method combines the elastic properties (e.g., inversion results) from multiple clusters to determine a relationship between the elastic properties and the formation heterogeneity along the borehole section 224 (e.g., to determine the elastic properties as a function of formation density and/or formation clay volume). The relationship can be determined by combining values from each cluster for an elastic property (e.g., $\gamma$) and plotting the values versus one or more formation characteristics (e.g., porosity) to generate a plurality of data points (e.g., within a graph or a data table). A function can be fit to the data points in order to define the relationship further as an equation. The function can be, for example, a linear function, a quadratic function, or a polynomial function. FIG. 9 shows a plot that was generated by combining inversion results for Thomsen's $\gamma$ from a plurality of clusters. The plot shows the relationship between an elastic property (e.g., Thomsen's parameter $\gamma$) as a function of formation heterogeneity (e.g., the properties that were used as the basis of the grouping process clay volume ($V_{cl}$) and porosity ($\phi$)). In this case, a plane 902 is fit onto data points 904 to yield an explicit relationship between elastic property ($\gamma$) and formation heterogeneity. The relationship in FIG. 9 can also be represented by the following equation:

$$\gamma = -0.117 + 0.735 V_{CL} + 0.377\phi \quad (10)$$

The method can also determine relationships between other elastic properties and formation characteristics, such as (1) Thomsen parameter delta ($\delta$) as a function of clay volume ($V_{CL}$) alone, (2) velocity ($V_{P0}$) as a function of clay volume ($V_{cl}$) and porosity ($\phi$), or (3) Thomsen parameter epsilon ($\epsilon$) as a function of clay volume ($V_{cl}$) and porosity ($\phi$). The embodiments of the method are not limited to any particular example described herein.

In some embodiments, the method combines the elastic properties from multiple clusters using the results of the confidence analysis. For example, if certain elastic property values from particular clusters have low uncertainty parameters (e.g., standard deviations), then those elastic property values may receive a higher weight in determining the relationship between the elastic property and the formation heterogeneity. On the other hand, certain elastic property values from particular clusters with low uncertainty parameters may be excluded from the analysis or may receive lower weights.

The processes described herein, such as (1) determining sonic velocity data for a formation from sonic log data, (2) determining characteristics of the formation from image log data, (3) determining characteristics of the formation from petrophysical log data, (4) grouping sonic velocity data into clusters, (5) inverting sonic velocity data within one or more clusters to determine elastic properties, and/or (6) combining the elastic properties from multiple clusters to determine a relationship between the elastic properties and formation heterogeneity, can be performed by a computer system.

Processes (1)-(6), as listed above, can be performed at a variety of different locations. For example, in one embodiment, a computer system is located at the well site as part of the surface equipment (e.g., the truck 310 in FIG. 3). Processes (1)-(6) are performed entirely at the well site using the computer system within the truck. The computer system acquires formation data from the wireline tool and uses the formation data to perform processes (1)-(6). In some cases, these calculations may be performed in real-time at the well site. In another embodiment, processes (1)-(6) are performed entirely at a location that is remote from the well site. For example, the computer system within the truck acquires the formation data and transmits the formation data over a communications network (e.g., a computer network) to a second computer system located at a remote location, such as an office building or a laboratory. The second computer system then performs processes (1)-(6) using the formation data. In yet another embodiment, the processes (1)-(6) are split between two different computer systems. For example, processes (1)-(3) are performed at the well site by the computer system within the truck and then the results (e.g., sonic velocity data and petrophysical log data) are communicated to the second computer system at the remote location. The second computer system then performs processes (4), (5) and (6) using the results of processes (1)-(3).

The term "computer system" should not be construed to limit the embodiments disclosed herein to any particular device type or system. The computer system may be a laptop computer, a desktop computer, or a mainframe computer. The computer system may include a graphical user interface (GUI) so that a user can interact with the computer system. The computer system may also include a computer processor (e.g., a microprocessor, microcontroller, digital signal processor, or general purpose computer) for executing any of the methods and processes described above (e.g. processes (1)-(6)).

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, formation data, petrophysical log data, sonic log data, sonic velocity data, relative dip data, elastic property data, and/or uncertainty parameter data.

Any of the methods and processes described above, including processes (1)-(6), as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the computer system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A computer-implemented method for determining a plurality of elastic properties for an heterogeneous anisotropic geological formation, the method comprising:
   grouping sonic velocity data from at least one borehole section into at least one cluster, wherein the sonic velocity data is grouped using petrophysical log data from the at least one borehole section;
   inverting the sonic velocity data for at least one cluster to determine a plurality of elastic properties for each cluster; and
   determining uncertainty parameters for each of the elastic properties, and wherein the uncertainty parameters comprise posterior probability distribution functions for combinations of elastic properties.

2. The method of claim 1, further comprising:
   combining the elastic properties for a plurality of the clusters to determine a relationship between the elastic properties and formation heterogeneity.

3. The method of claim 1, wherein the anisotropic formation is transversely isotropic.

4. The method of claim 3, wherein the plurality of elastic properties comprises five elastic properties.

5. The method of claim 4, wherein the five elastic properties comprise three Thomsen parameters and two velocities.

6. The method of claim 1, wherein the elastic properties are independent of each other.

7. The method of claim 1, wherein at least some of the elastic properties are dependent on each other.

8. The method of claim 1, wherein the plurality of elastic properties comprises components of elastic stiffness tensors.

9. The method of claim 1, wherein the plurality of elastic properties comprises components of elastic compliance tensors.

10. The method of claim 1, wherein the plurality of elastic properties comprises elastic Young's moduli and Poisson's ratios.

11. The method of claim 1, wherein at least some of the elastic properties are density normalized.

12. The method of claim 1, wherein the sonic velocity data is inverted using a misfit-norm-based iterative process.

13. The method of claim 1, wherein the uncertainty parameters are determined using a Bayesian probability method.

14. The method of claim 1, wherein the uncertainty parameters comprise posterior probability distribution functions for each of the elastic properties.

15. The method of claim 1, wherein the petrophysical log data comprise data selected from the group consisting of: gamma ray measurements, density measurements, clay volume measurements, porosity measurements, resistivity measurements, mineralogical measurements, and a combination thereof.

16. The method of claim 1, further comprising:
   acquiring sonic log data for the borehole section; and
   analyzing the sonic log data to determine the sonic velocity data for the borehole section.

17. The method of claim 3, further comprising:
   determining a dip azimuth and a dip angle of a transverse isotropic plane for the transversely isotropic formation.

18. The method of claim 17, wherein the dip azimuth and dip angle are determined from borehole image logs for the borehole section.

19. The method of claim 17, further comprising:
   determining borehole azimuth and borehole deviation for the borehole section.

20. The method of claim 19, further comprising:
   determining a relative dip angle between an axis of the borehole section and the transverse isotropic plane.

21. The method of claim 1, wherein the at least one borehole section comprises a plurality of borehole sections from at least two different wells.

22. A non-transitory computer readable medium encoded with instructions, which, when loaded on a computer, establish processes for determining a plurality of elastic properties for a heterogeneous anisotropic geological formation, the processes comprising:
   grouping sonic velocity data from at least one borehole section into at least one cluster, wherein the sonic velocity data is grouped using petrophysical log data from the at least one borehole section;
   inverting the sonic velocity data for at least one cluster to determine a plurality of elastic properties for each cluster;
   determining uncertainty parameters for each of the elastic properties, and wherein the uncertainty parameters comprise posterior probability distribution functions for combinations of elastic properties.

23. The non-transitory computer readable medium according to claim 22, wherein the processes further comprise:
   combining the elastic properties for a plurality of the clusters to determine a relationship between the elastic properties and formation heterogeneity.

24. The non-transitory computer readable medium according to claim 22, wherein the anisotropic formation is transversely isotropic.

25. The non-transitory computer readable medium according to claim 24, wherein the plurality of elastic properties comprises five elastic properties.

26. A system for determining a plurality of elastic properties for a heterogeneous anisotropic geological formation, the system comprising:
   a processor; and
   a memory storing instructions executable by the processor to perform processes that include:

grouping sonic velocity data from at least one borehole section into at least one cluster, wherein the sonic velocity data is grouped using petrophysical log data from the at least one borehole section;

inverting the sonic velocity data for at least one cluster to determine a plurality of elastic properties for each cluster;

determining uncertainty parameters for each of the elastic properties, and wherein the uncertainty parameters comprise posterior probability distribution functions for combinations of elastic properties.

27. The system according to claim 26, wherein the processes further comprise:

combining the elastic properties for a plurality of the clusters to determine a relationship between the elastic properties and formation heterogeneity.

28. The system according to claim 26, wherein the anisotropic formation is transversely isotropic.

* * * * *